Oct. 25, 1949.  G. ORNSTEIN  2,485,840
APPARATUS FOR SUPPLYING A TREATING GAS
Filed July 21, 1944
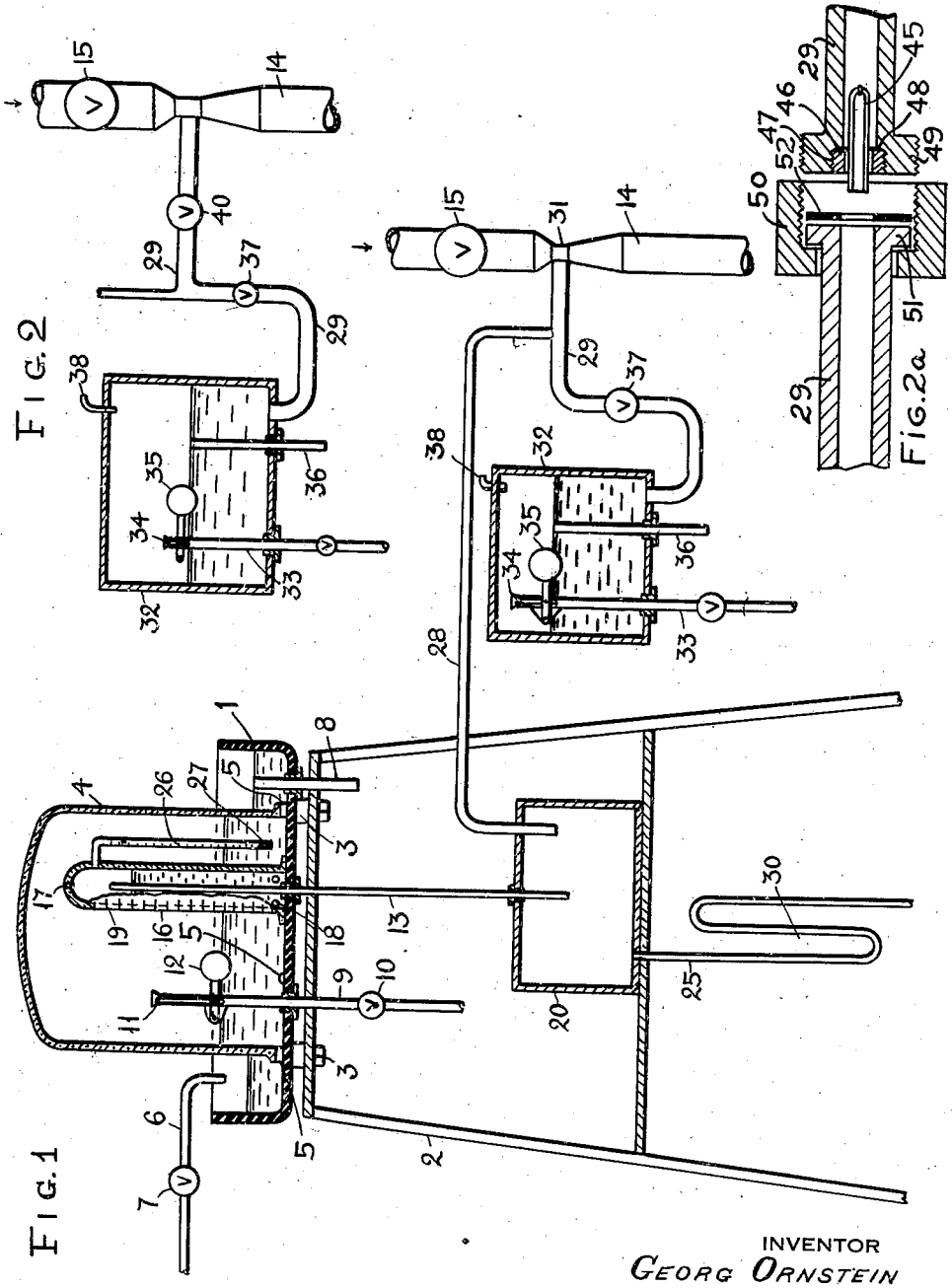
INVENTOR
GEORG ORNSTEIN
BY
Friedrich E. Hahn
ATTORNEY Patented Oct. 25, 1949

2,485,840

UNITED STATES PATENT OFFICE 2,485,840

APPARATUS FOR SUPPLYING A TREATING GAS

Georg Ornstein, New York, N. Y.

Application July 21, 1944, Serial No. 546,041

11 Claims. (Cl. 210—28)

1

The invention relates to apparatus for supplying a treating gas at a controlled rate and more particularly to apparatus for supplying a sterilizing gas such as chlorine or sulphur dioxide gas at a controlled and measured rate to a flowing medium such as water, for instance water of cities or sewage.

In treating water with chlorine or any other suitable treating gas, the chlorine is fed into the stream of water to be treated, preferably in the form of an aqueous solution. In order to know the amount of chlorine being supplied, the rate of supply of the chlorine must be accurately controlled and measured. Various methods of control have been developed. One which is widely known and used in chlorine control apparatus, also known as chlorinators, is to pass the gas through a flow controlling orifice thereby causing a drop of pressure between the up stream side and the down stream side of the orifice and to control the rate of flow of the gas by varying the drop of pressure across the orifice.

One type of apparatus based on this method of control and to which the invention relates more specifically comprises a closed container such as a bell jar into which the sterilizing gas is admitted, suction means for withdrawing gas from the bell jar after it has passed through the flow controlling orifice, means to discharge the aspirated gas together with so-called makeup water into the water to be treated and means for controlling the pressure drop by regulating the gas pressure on the down stream side of the orifice while maintaining the gas pressure on the up stream side of the orifice substantially constant.

One of the features and advantages of the invention is to provide novel and improved means for controlling the rate of flow of the treating gas with apparatus of the type previously described.

Another of the features and advantages of the invention is to provide novel and improved means for controlling the rate of flow of the treating gas by varying the proportion of gas and makeup water in the total quantity of gas and water aspirated by the suction means and then discharged into the water to be treated.

Another of the features and advantages of the invention is to provide novel and improved means to control the rate of flow of the treating gas by controlling and adjusting the quantity of the makeup water, for example, by conventional valve means while leaving the adjustment of all parts in contact with the gas or a gas-water solution

2 unchanged. I thereby eliminate all difficulties and disadvantages caused by the adjustment of movable parts exposed to a highly corrosive agent such as chlorine.

Another of the features and advantages of the invention is to provide means to reduce the consumption of makeup water. I hereby accomplish a reduction of the required quantity of makeup water, a simplification of the pumping equipment for this water and a decrease of the energy used for heating the makeup water in cold weather when such heating is required to avoid the formation of chlorine hydrate frequently causing a clogging of the pipes and valves.

Other and further advantages of the invention will hereinafter be set forth and the novel features thereof defined by the appended claims.

In the accompanying drawings several embodiments of the invention are shown.

Figure 1 is a diagrammatic view of an apparatus according to the invention for applying chlorine or any other suitable sterilizing gas to a liquid, and Figure 2 shows a modification of a detail of an apparatus according to the invention, and Fig. 2a shows a sectional view of a modified detail of the apparatus according to Fig. 2.

The apparatus shown in Figure 1 comprises an open receptacle 1 such as a tray, made of any suitable material such as hard rubber or glass. The tray is supported on a frame or standard 2 of conventional design and may be secured to the standard by means of screws 3. A container 4 such as a bell jar, preferably made of a transparent material for example glass is placed in tray 1 so that a closed space is formed. At or near the lower edge of container 4 vents or channels 5 are provided to permit a circulation of water between the tray and the bell jar.

Water is admitted into the tray by means of a pipe 6. The level of the water in the tray is maintained substantially constant by means of a valve 7 inserted in pipe 6 and an overflow pipe 8 provided in the tray. The valve 7 may be of any suitable design.

The treating gas such as chlorine or any other suitable sterilizing gas is admitted into bell jar 4 through a pipe 9 which may be controlled by a conventional valve 10. Pipe 9 supports at its top a suitable valve such as a float valve 11 having a float 12. Float valve 11 is set and adjusted so that it will open and admit fresh chlorine gas into the bell jar when the water in the bell jar reaches a predetermined level. If the water drops below this level the float valve will close again. By this means a constant water level may be maintained inside bell jar 4 independent of the level of the water in open tray 1 and a constant flow of gas into the bell jar is assured.

Passed up through the bottom of tray 1 is a pipe 13 which communicates with an aspirator or injector 14 as will be more fully explained hereinafter. This aspirator for example, a Venturi type aspirator, may be controlled by a valve 15 in a conventional manner. A current of liquid, for example water, is flowing through the aspirator in the direction indicated by an arrow and produces a certain suction through pipe 13. The section of the pipe 13 extending into the bell jar is surmounted by a tube 16 having a small orifice 17 in its otherwise closed top. The lower end of tube 16 extends below the level of the water in bell jar 4 and is either open or has a number of perforations 18 permitting a circulation of water between the tube 16 and the bell jar. Tube 16 is preferably provided with a calibration 19 indicating the water level in tube 16. Instead of or in addition to the calibration 19 on tube 16 a calibrated tube 26 connected to tube 16 above the level of pipe 13 and extending below the water level may be provided. A restriction 27 is preferably provided to reduce jerking of the water in tube 26, thus facilitating the reading of the water level. The lower end of pipe 13 ends in a closed container 20 serving as a trap for water passing together with chlorine into pipe 13 from tube 16. The water accumulating in container 20 is discharged through a pipe 25 to waste. Container 20 will also serve as an equalizer due to its volume. In order to prevent an escape of chlorine from container 20 through pipe 25, a trap 30 is preferably included in pipe 25. This trap may be a double-U-shaped section of pipe 25. The upwardly directed part should be at least so long that the water in it will balance a hydrostatic head equal to the distance between the top of tube 13 and the top of overflow 8, so that no air can be sucked in through the trap when the sealing water in the trap is subjected to the maximum negative head. Chlorine passed into container 20 through pipe 13 is conducted from this container through a pipe 28 and discharged into a pipe 29. Pipe 29 discharges into the throat 31 of aspirator 14. This pipe serves to pass the aspirated chlorine and the so-called makeup water into the aspirator and hence into the water to be treated, makeup water being the water required to make up the balance of the aspirating capacity of the aspirator that is not taken up by the flow of the aspirated gas. The makeup water is drawn from a supply of water in a container 32 with which pipe 29 is connected. Container 32 is preferably closed and provided with a vent 38. The water is admitted into container 32 for example through a pipe 33 at the top of which a float valve 34 having a float 35 is provided. This float valve serves to maintain a substantially constant water level in container 32. An over flow pipe 36 may also be provided. The flow of water through pipe 29 is controlled by means of a valve 37 of any suitable design.

The water level in container 32 and the aspirator throat 31 are preferably placed on substantially the same level. The container 32 may be arranged separately from frame 2 as shown or be supported by the frame 2.

Under certain circumstances the trap 20 may be omitted. Then the pipes 13 and 28 are directly connected.

The operation of an apparatus according to the invention is as follows:

Assuming that a current of water is flowing through aspirator or injector 14 and water is admitted into tray 1 through pipe 6, then the pressure in the bell jar will be reduced below the atmospheric pressure and the level of the water flowing into the bell jar through openings 5 will be sucked up and rise to a substantially constant level higher than the water level in tray 1 as controlled by chlorine valve 11 so that a negative pressure is built up in bell jar 4. The chlorine admitted into the bell jar is drawn off through orifice tube 16, pipes 13, 28 and 29 and discharged into aspirator 14. The orifice 17 causes a certain drop of pressure between the up stream side and the down stream side of the orifice, the pressure on the down stream side being more negative than the pressure on the up stream side. This pressure drop will force the level of the water entering the orifice tube through holes 18 to rise in the orifice tube above the level of the water in the bell jar. The greater the pressure drop is, the more chlorine will be drawn through the orifice and the higher the water column in the orifice tube will rise. Hence the level of the water in tube 16 is a direct indication of the rate of flow of the gas and scale 19 or the scale on tube 26 will permit a direct reading of the rate of flow or of the volume of the aspirated chlorine. If the water column in the orifice tube rises so high that the water will flow into pipe 13, such water will be trapped in container 20 and removed to waste through pipe 25 as previously described. The aspirated chlorine is discharged into pipe 29 through pipe 28 and passed together with the makeup water flowing through pipe 29 into the water current flowing through the aspirator 14.

The total volume of the aspirated gas and the water must satisfy the suction power of the aspirator. Hence a throttling of the aspirated water will result in an increase of the proportion of the gas drawn off relative to the water and vice versa. Consequently, a regulation of the flow of water through pipe 29 by valve 37 will also control the rate of flow of the gas which can be observed on scale 19.

Such control of the rate of flow of the gas by regulating the flow of the substantially pure makeup water and without adjusting any part in contact with chlorine or a chlorine-water solution is very convenient and reliable, none of the problems caused by the highly corrosive properties of chlorine being present.

The modification according to Figure 2 is distinguished from the embodiment shown in Figure 1 by providing in pipe 29 restricting means such as a valve 40 of conventional design for controlling the flow of chlorine and water through the pipe.

Instead of providing a regulating valve such as valve 40 it is also possible to use exchangeable orifices having different cross sections. Fig. 2a illustrates a simple and convenient arrangement for the use of exchangeable orifices. As is shown in Fig. 2a, pipe 29 is divided and in one of the pipe sections thus formed a conventional orifice tube 45 having the desired cross section is inserted. The orifice tube is held in position by means of a screw 46 tightly fitted on the orifice tube and screwed into a threaded recess 47 of pipe 29. A tight fitting between the orifice tube and pipe 29 is obtained by means of a rubber washer 48. The two tube sections are joined by a conventional joint comprising a threaded collar 49 fastened to the right hand tube section on which collar is threaded the loose nut 50 held in position on the left hand tube section by means of a collar 51. A gasket may be provided to secure a tight fit between the two tube sections. When it is desired to exchange the orifice tube the tube is removed after loosening the tube sections and replaced by another one having the desired cross section.

The modification according to Figure 2 operates as follows:

The valve 40 is fully opened and the makeup water valve 37 is throttled until the water column in orifice tube 16 reaches its highest point. Then the flow of gas will reach the maximum value and satisfy together with the makeup water the full aspirating capacity of the aspirator. Thereupon valve 40 is throttled until the water column in the orifice tube indicates that there is practically no flow of gas. Valve 40 is left in this position and the chlorine flow is now controlled merely by adjusting makeup water valve 37 as described in connection with Figure 1.

One of the advantages of the modification shown in Figure 2 is that only a minimum of makeup water is consumed. This not only reduces the consumption of makeup water but also decreases the cost and time of heating of the makeup water when such heating is required in cold weather to avoid the formation of chlorine hydrate and the subsequent clogging of the pipes and the valves.

Having thus described my invention, what I claim as new and desire to secure by Letters Patent is:

1. An apparatus for supplying a treating gas to a liquid to be treated comprising a closed container, valve means for admitting the gas into the closed container and maintaining the same at a constant pressure, a second container, second valve means for admitting liquid into the second container and maintaining the same at a substantially constant level, conduit means constructed and positioned to discharge gas from the closed container into the liquid to be treated, second conduit means constructed and positioned to discharge liquid from the second container into the liquid to be treated, suction means operatively connected with said first and second conduit means for aspirating gas through the first conduit means and liquid through the second conduit means, and third valve means included in the liquid discharge means for regulating the flow of aspirated liquid, thereby varying the proportion of gas and liquid aspirated by the suction means.

2. An apparatus for supplying a treating gas to a liquid to be treated comprising a closed container, valve means for admitting the gas into the closed container and maintaining the same at a constant pressure, a second container, second valve means for admitting liquid into the second container and maintaining the same at a substantially constant level, conduit means constructed and positioned to discharge gas from the closed container into the liquid to be treated, second conduit means constructed and positioned to discharge liquid from the second container into the liquid to be treated, suction means having a predetermined suction power operatively connected with the first and the second conduit means for aspirating gas through the first conduit means and liquid through the second conduit means, and third valve means for controlling the amount of liquid discharged into the liquid to be treated, thereby controlling the proportion of gas and liquid aspirated to satisfy the suction power of the suction means.

3. An apparatus for supplying a treating gas to a liquid to be treated comprising a tray in which is maintained a body of liquid, overflow means for maintaining said body of liquid at a substantially constant level, a closed container having an opening for admitting liquid from the tray into the container, valve means for admitting gas into said container and maintaining the same at a constant pressure, a member within said container providing a flow controlling orifice, a second container, second valve means for admitting liquid into the second container and maintaining the same at a substantially constant level, suction means communicating with said orifice member and said second container for aspirating gas through said orifice and liquid from the second container, conduit means for discharging aspirated gas and liquid into the liquid to be treated, and third valve means for controlling the flow of aspirated liquid, thereby varying the proportion of gas and liquid aspirated by the suction means.

4. An apparatus for supplying a treating gas to a liquid to be treated comprising a tray in which is maintained a body of liquid, overflow means for maintaining said body of liquid at a substantially constant level, a closed container having an opening for admitting liquid from the tray into the container, valve means for admitting gas into the container and maintaining the same at a constant pressure, a tubular member placed in said container, said member providing a flow controlling orifice positioned at a level so as to admit gas into the tubular member and having an opening positioned at a level so as to admit liquid from the container into the tubular member, a second container, second valve means for admitting liquid into the second container and maintaining the same at a substantially constant level, suction means communicating with the orifice member and the second container for aspirating gas through said orifice and liquid from the second container, conduit means for discharging aspirated gas and liquid into the liquid to be treated, and third valve means for controlling the flow of aspirated liquid, thereby varying the proportion of gas and liquid aspirated by the suction means.

5. An apparatus for supplying a treating gas to a liquid to be treated comprising a tray in which is maintained a body of liquid, overflow means for maintaining said body of liquid at a substantially constant level, a closed container having an opening for admitting liquid from the tray into the container, valve means for admitting gas into the container and maintaining the same at a constant pressure, a tubular member placed in said closed container, said member providing a flow controlling orifice having an upstream side and a downstream side positioned at a level so as to admit gas into the tubular member and an opening positioned at a level so as to admit liquid from the container into the tubular member, a second container, second valve means for admitting liquid into the second container and maintaining the same at a substantially constant level, a conduit connecting the tubular member at the downstream side of the orifice with the liquid to be treated, a second conduit connecting the second container with the liquid to be treated, suction means communicating with said member at the downstream side of said orifice and with the second container for aspirating gas through the orifice and liquid from said second container through the respective conduits and discharging the gas and the liquid into the liquid to be treated, and third valve means for controlling the flow of aspirated liquid through the second conduit, thereby varying the proportion of gas and liquid aspirated by the suction means.

6. An apparatus for supplying a treating gas to a liquid to be treated comprising a tray in which is maintained a body of liquid, overflow means for maintaining said body of liquid at a substantially constant level, a closed container having an opening for admitting liquid from the tray into the container, valve means for admitting the gas into the container and maintaining the same at a constant pressure, a tubular member placed in said closed container, said member providing a flow controlling orifice having an upstream side and a downstream side positioned at a level so as to admit gas into the tubular member and an opening positioned at a level so as to admit liquid from the container into the tubular member, a second container, second valve means for admitting liquid into the second container and maintaining the same at a substantially constant level, a conduit connecting the tubular member at the downstream side of the orifice with the liquid to be treated, a second conduit connecting the second container with the liquid to be treated, suction means communicating with the said member at the downstream side of said orifice and with the second container for aspirating gas through the orifice and liquid from said second container through the respective conduits and discharging the gas and the liquid into the liquid to be treated, a liquid trap included in the first conduit for trapping liquid passing through the first conduit, and third valve means for controlling the flow of aspirated liquid through the second conduit, thereby varying the proportion of gas and liquid aspirated by the suction means.

7. An apparatus for supplying a treating gas to a liquid to be treated comprising a tray in which is maintained a body of liquid, overflow means for maintaining said body of liquid at a substantially constant level, a closed container having an opening for admitting liquid from the tray into the container, valve means for admitting gas into the container and maintaining the same at a constant pressure, a tubular member placed in said closed container, said member providing a flow controlling orifice positioned at a level so as to admit gas into the tubular member and having an opening positioned at a level so as to admit liquid from the container into the tubular member, a second tubular member disposed within said first tubular member and communicating with the liquid to be treated for discharging gas from said container into the liquid to be treated, a second container, second valve means for admitting liquid into the second container and maintaining the same at a substantially constant level, a conduit connecting the second container with the liquid to be treated for discharging liquid from the second container into the liquid to be treated, suction means communicating with said second tubular member and the second container for aspirating gas from the first container through the flow controlling orifice and liquid from the second container, and third valve means for regulating the flow of liquid through said conduit, thereby varying the proportion of gas and liquid aspirated by the suction means.

8. An apparatus as described in claim 7, wherein the tubular member providing the flow controlling orifice is associated with calibration means for indicating the rate of flow of gas discharged into the liquid to be treated.

9. An apparatus for supplying a treating gas to a liquid to be treated comprising a tray in which is maintained a body of liquid, overflow means for maintaining said body of liquid at a substantially constant level, a closed container having an opening for admitting liquid from the tray into the container, valve means for admitting gas into the container and maintaining the same at a constant pressure, a tubular member placed in said closed container, said member providing a flow controlling orifice positioned at a level so as to admit gas into the tubular member and having an opening positioned at a level so as to admit liquid from the container into the tubular member, a second tubular member disposed within said first tubular member for discharging gas from said container, a second container, second valve means for admitting liquid into the second container and maintaining the same at a substantially constant level, a conduit for admitting gas discharged through the second tubular member into the liquid to be treated, a closed receptacle included in said conduit for trapping liquid entering into and flowing through the second tubular member, means for discharging trapped liquid from said receptacle, a second conduit connecting the second container with the liquid to be treated for discharging liquid from the second container into the liquid to be treated, suction means communicating with the second tubular member and the second container for aspirating gas from the first closed container through the flow controlling orifice and liquid from the second container, and third valve means for regulating the flow of aspirated liquid through the second conduit, thereby varying the proportion of gas and liquid aspirated by the suction means.

10. An apparatus for supplying a treating gas to a liquid to be treated comprising a closed container, valve means for admitting gas into the container and maintaining the same at a constant pressure, a member within the container providing a flow controlling orifice having an upstream and a downstream side, a second container, second valve means for admitting liquid into the second container and maintaining the same at substantially the same level, a Venturi type aspirator for aspirating gas from the closed container and liquid from the second container, a conduit connecting the gas filled space on the downstream side of the orifice of said member with the aspirator, a second conduit connecting the liquid containing space in the second container with the aspirator, both conduits being arranged and disposed to discharge gas and liquid respectively into the throat of the aspirator, and third valve means for regulating the flow of liquid through the second conduit, thereby varying the proportion of gas and liquid aspirated by the aspirator.

11. An apparatus for supplying a treating gas to a liquid to be treated comprising a closed container, valve means for admitting gas into the container and maintaining the same at a constant pressure, a member within the container providing a flow controlling orifice having an upstream and a downstream side, a second container, second valve means for admitting liquid into the second container and maintaining the same at substantially the same level, suction means communicating with the downstream side of said orifice member and the second container for aspirating gas from the closed container through said orifice and liquid from the second container, a conduit connecting the gas filled space on the downstream side of the orifice of said member with the suction means, a second conduit connecting the liquid containing space of the second container with the suction means, third valve means for regulating the flow of liquid through the second conduit, thereby varying the proportion of gas and liquid aspirated by the suction means, and fourth valve means for regulating the total volume of liquid and gas aspirated by the suction means through said conduits.

GEORG ORNSTEIN.

REFERENCES CITED

The following references are of record in the file of this patent:

UNITED STATES PATENTS

| Number | Name | Date |
|---|---|---|
| 1,514,939 | Wallace | Nov. 11, 1924 |
| 1,777,986 | Wallace | Oct. 7, 1930 |
| 2,086,957 | Peet | July 13, 1937 |
| 2,096,021 | Aherne | Oct. 19, 1937 |
| 2,151,142 | Pardee | Mar. 21, 1939 |
| 2,158,976 | Booth | May 16, 1939 |
| 2,158,985 | Peet | May 16, 1939 |
| 2,300,642 | Booth | Nov. 3, 1942 |
| 2,358,587 | Ornstein | Sept. 19, 1944 |
| 2,376,178 | Ornstein | May 15, 1945 |
| 2,387,406 | Ornstein | Oct. 23, 1945 |